US009007448B2

(12) United States Patent
Calman

(10) Patent No.: US 9,007,448 B2
(45) Date of Patent: Apr. 14, 2015

(54) VIDEO-ASSISTED CUSTOMER EXPERIENCE

(75) Inventor: Matthew A. Calman, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 386 days.

(21) Appl. No.: 13/366,058

(22) Filed: Feb. 3, 2012

(65) Prior Publication Data

US 2013/0201306 A1   Aug. 8, 2013

(51) Int. Cl.
 H04N 7/18   (2006.01)
 H04N 9/47   (2006.01)
 G06F 17/28   (2006.01)
 H04N 7/14   (2006.01)

(52) U.S. Cl.
 CPC .................................... *H04N 7/141* (2013.01)

(58) Field of Classification Search
 CPC ........ H04N 7/18; H04N 7/181; G06F 3/0304; G10L 15/30; G07F 19/207; G07F 19/20; G07G 3/00
 USPC ......................................... 348/61, 150; 704/2
 See application file for complete search history.

(56) References Cited

U.S. PATENT DOCUMENTS

| | | | |
|---|---|---|---|
| 5,604,341 A * | 2/1997 | Grossi et al. | 235/379 |
| 2005/0251394 A1 * | 11/2005 | Carro | 704/270.1 |
| 2009/0177461 A1 | 7/2009 | Ehsani et al. | |
| 2010/0185434 A1 | 7/2010 | Burvall et al. | |
| 2011/0246172 A1 * | 10/2011 | Liberman et al. | 704/2 |
| 2012/0274730 A1 * | 11/2012 | Shanmukhadas et al. | 348/14.08 |
| 2012/0275761 A1 * | 11/2012 | Li et al. | 386/239 |

FOREIGN PATENT DOCUMENTS

EP   2325838 A1   5/2011

* cited by examiner

*Primary Examiner* — Dave Czekaj
*Assistant Examiner* — Tsion B Owens
(74) *Attorney, Agent, or Firm* — Michael A. Springs; Moore & Van Allen PLLC; Nicholas C. Russell

(57) ABSTRACT

A video-assisted customer experience is disclosed. Generally, the experience includes a communications link between a user and a business representative facilitated by an external apparatus such as an ATM, mobile device, user's workstation, teleconferencing system, etc. The communications link may be a one or two-way video link such that the user may view video of the business representative or a representation of the business representative. The experience utilizes speech-recognition technology to incorporate subtitles in the video stream.

25 Claims, 6 Drawing Sheets

VIDEO-ASSISTED CUSTOMER EXPERIENCE

BACKGROUND

In today's "digital age," more and more processes are becoming digital or automated. While customers have benefited in many aspects from the evolving technology, there are many areas in which a customer's experience may be improved. For instance, the number of transactions or customer service requests or needs from users utilizing an external apparatus (e.g., mobile device, automated teller machine (ATM), user's personal workstation such as a computer, teleconferencing system, etc.) have dramatically increased as technology evolves. Thus, while a customer may have new and/or improved options for transactions, customer service, etc., such options lack a personal feel for the customer.

As such, a need presently exists for providing improved customer experiences. In particular, a need presently exits for providing video-assisted customer experiences.

SUMMARY

The following presents a simplified summary of several embodiments of the invention in order to provide a basic understanding of such embodiments. This summary is not an extensive overview of all contemplated embodiments of the invention, and is intended to neither identify key or critical elements of all embodiments, nor delineate the scope of any or all embodiments. Its purpose is to present some concepts of one or more embodiments in a simplified form as a prelude to the more detailed description that is presented later.

Embodiments of the present invention address the above needs and/or achieve other advantages by providing a video-assisted customer experience. Particularly, embodiments of the present invention are directed to a customer experience in which the customer may interact with a representative of a business electronically via an external apparatus accessed by the customer. The electronic interaction is generally video-assisted such that the customer may utilize the external apparatus to communicate directly with a live representative of the business. The display of the external apparatus may be utilized in order to present, in text-form (i.e., subtitles), the words spoken by the business representative.

In a first aspect of the present invention, a method for providing a video-assisted customer experience is provided. The method includes providing a communications link between a customer and a business representative. The communications link is facilitated by an external apparatus that includes a display. The communications link includes video such that the customer may view the business representative or a representation of the business representative on the display. The method further includes utilizing speech-recognition to provide subtitles of the words spoken by the business representative viewable to the customer.

In some embodiments of the method, the external apparatus is an automated teller machine (ATM). In some embodiments, the method further includes archiving a record of the customer experience such that the subtitles are searchable. In some embodiments of the method, the speech-recognition is voice-recognition. In some embodiments of the method, the subtitles are translated and presented to the customer in a different language than the language spoken by the business representative. In some embodiments of the method, the communications link is a one-way video link such that the customer may view the business representative or a representation of the business representative. In some embodiments of the method, the communications link is a two-way video link such that the customer may view the business representative or a representation of the business representative and the business representative may view the customer or a representation of the customer. In some such embodiments, the subtitles of the words spoken by the customer are displayed to the business representative. In some embodiments of the method, the speech-recognition is configured to detect key words or phrases spoken and present the detected key words as interactive words in the subtitles.

In another aspect of the present invention, a system for providing a video-assisted customer experience is provided. The system includes a network and an external apparatus in communication with the network. The external apparatus includes a display and a processing device. The processing device is configured to execute computer-readable program code to provide a communications link between a customer and a business representative. The communications link includes video such that the customer may view the business representative or a representation of the business representative on the display. The processing device is further configured to execute computer-readable program code to utilize speech-recognition to provide subtitles of the words spoken by the business representative viewable to the customer.

In some embodiments of the system, the external apparatus is an automated teller machine (ATM). In some embodiments, the processing device is further configured to execute computer-readable program code to archive a record of the customer experience such that the subtitles are searchable. In some embodiments of the system, the subtitles are translated and presented to the customer in a different language than the language spoken by the business representative. In some embodiments of the system, the communications link is a one-way video link such that the customer may view the business representative or a representation of the business representative. In some embodiments of the system, the communications link is a two-way video link such that the customer may view the business representative or a representation of the business representative and the business representative may view the customer or a representation of the customer. In some such embodiments, the subtitles of the words spoken by the customer are displayed to the business representative. In some embodiments of the system, the speech-recognition is configured to detect key words or phrases spoken and present the detected key words as interactive words in the subtitles.

In another aspect of the present invention, a computer-readable storage medium including computer program code for providing a video-assisted customer experience is provided. The storage medium includes instructions for providing a communications link between a customer and a business representative. The communications link is facilitated by an external apparatus that includes a display. The communications link includes video such that the customer may view the business representative or a representation of the business representative on the display. The program code further includes instructions for utilizing speech-recognition to provide subtitles of the words spoken by the business representative viewable to the customer.

In some embodiments of the storage medium, the external apparatus is an automated teller machine (ATM). In some embodiments, computer program code further includes instructions for archiving a record of the customer experience such that the subtitles are searchable. In some embodiments of the storage medium, the subtitles are translated and presented to the customer in a different language than the language spoken by the business representative. In some embodiments of the storage medium, the communications link is a one-way video link such that the customer may view the business representative or a representation of the business representative. In some embodiments of the storage medium, the communications link is a two-way video link such that the customer may view the business representative or a representation of the business representative and the business representative may view the customer or a representation of the customer. In some such embodiments, the subtitles of the words spoken by the customer are displayed to the business representative. In some embodiments of the storage medium, the speech-recognition is configured to detect key words or phrases spoken and present the detected key words as interactive words in the subtitles.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In accordance with embodiments of the invention, the term "entity" may refer to a customer, seller, merchant, or the like. In accordance with embodiments of the invention, the term "user" may refer to a customer or the like, who utilizes an external apparatus capable of facilitating a communication link between the user and a business representative. In accordance with embodiments of the invention, the term "business representative" may refer to a live representative that provides customer service to the user. "Business representative" is intended to encompass any person represents the business from which the user seeks customer service. It is not necessary that the representative be employed by the business; however the representative would have authority to provide customer service on behalf of the business.

In accordance with embodiments of the invention, the term "financial institution" refers to any organization in the business of moving, investing, or lending money, dealing in financial instruments, or providing financial services. This includes commercial banks, thrifts, federal and state savings banks, savings and loan associations, credit unions, investment companies, merchants, insurance companies and the like.

In general, embodiments of the present invention relate to a video-assisted customer experience. Generally, the experience includes a communications link between a user and a business representative facilitated by an external apparatus such as an ATM, mobile device, user's workstation, teleconferencing system, etc. The communications link may be a one or two-way video link such that the user may view video of the business representative or a representation of the business representative. The experience utilizes speech-recognition technology to incorporate subtitles in the video stream.

Figure 1:
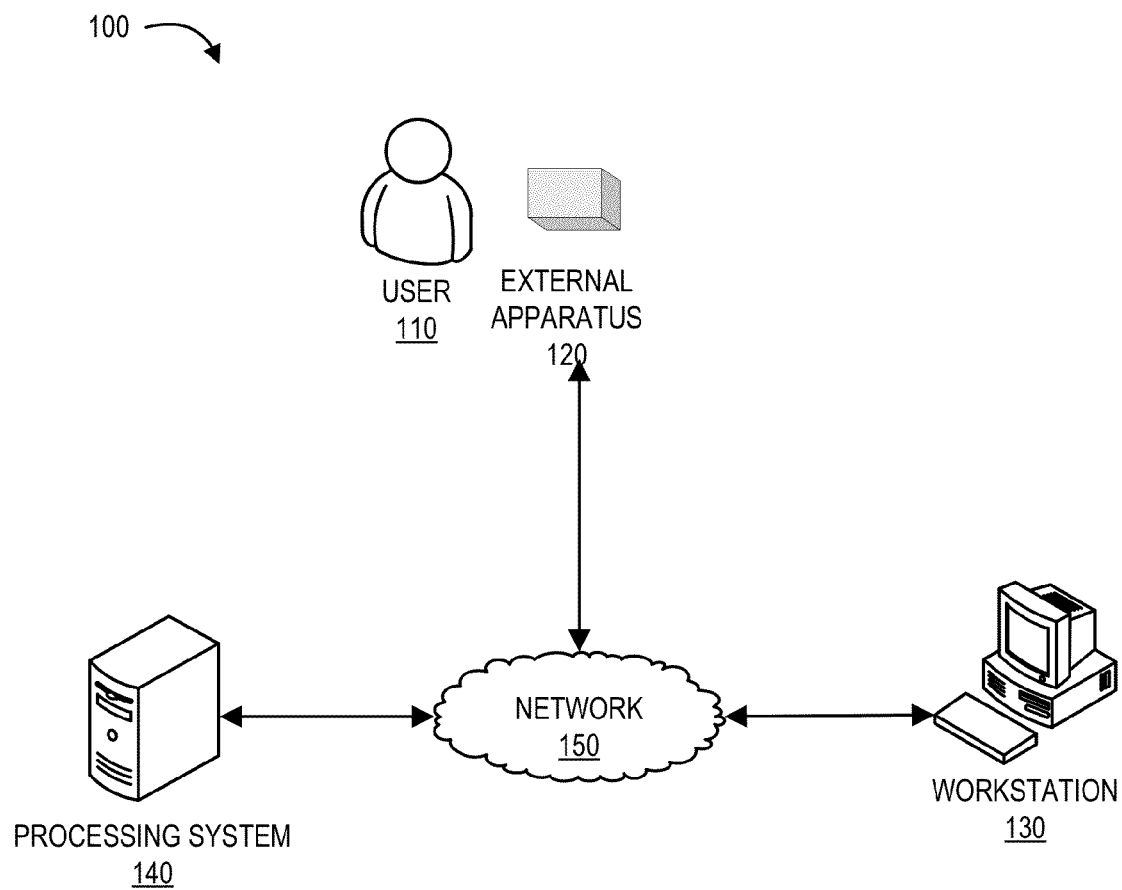
FIG. 1 illustrates a block diagram illustrating a customer experience environment, in accordance with an embodiment of the invention.

Referring to FIG. 1, a block diagram illustrating a customer experience environment 100 configured for communication between a customer user 110 and a business representative via an external apparatus 120 is shown. The customer experience environment 100 may also include a workstation 130 and a processing system 140 that are in electronic communication with the external apparatus 120 via a network 150, which may be the Internet, an intranet or the like.

In FIG. 1, the network 150 may include a local area network (LAN), a wide area network (WAN), and/or a global area network (GAN). The network 150 may provide for wireline, wireless, or a combination of wireline and wireless communication between devices in the network. In some embodiments, the network 150 includes the Internet. In some embodiments, the network 150 may include a wireless telephone network.

As illustrated in FIG. 1, the external apparatus 120 may be connected to a workstation 130 via the network 150. The workstation 130 may be used by a third party/entity such as a business representative to interact with the external apparatus 120. The workstation 130 may include various features, such as a network communication interface, a processing device, a user interface, and a memory device.

As used with respect to the workstation 130, a "communication interface" may generally include a modem, server, transceiver, and/or other device for communicating with other devices on a network. The network communication interface may be a communication interface having one or more communication devices configured to communicate with one or more other devices on the network 150, such as the contactless apparatus 130, the processing system 140, other processing systems, data systems, etc.

Additionally, referring to the workstation 130, a "processing device" may generally refer to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system may be allocated between these processing devices according to their respective capabilities. The processing device may further include functionality to operate one or more software programs based on computer-executable program code thereof, which may be stored in a memory. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device may be configured to use the network communication interface to transmit and/or receive data and/or commands to and/or from the other devices connected to the network 150.

Furthermore, a "user interface" within the workstation 130 may generally include a plurality of interface devices and/or software that allow a user to input commands and data to direct the processing device to execute instructions. For example, the user interface may include a graphical user interface (GUI) or an interface to input computer-executable instructions that direct the processing device to carry out specific functions. The user interface may employ certain input and output devices to input data received from the user 110 or output data to the user 110. These input and output devices may include a display, mouse, keyboard, button, touchpad, touch screen, microphone, speaker, light, joystick, switch, and/or other customer input/output device for communicating with one or more customers.

A "memory device" within the workstation 130 may generally refer to a device or combination of devices that store one or more forms of computer-readable media for storing data and/or computer-executable program code/instructions. For example, the memory device may include any computer memory that provides an actual or virtual space to temporarily or permanently store data and/or commands provided to the processing device when it carries out its functions described herein.

Figure 2:
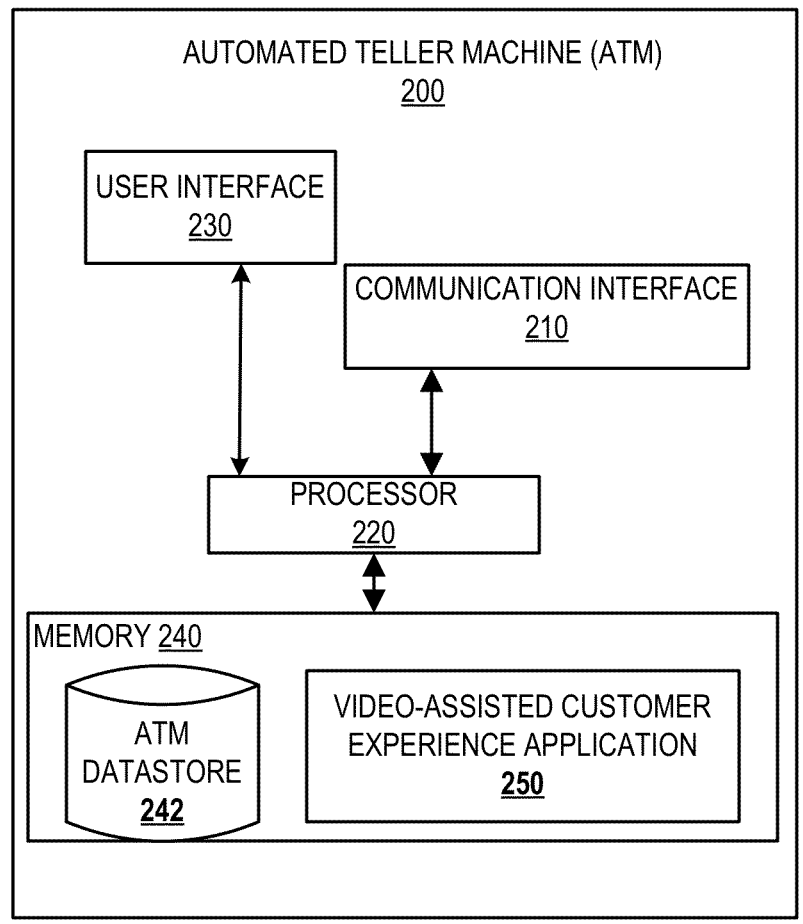
FIG. 2 illustrates a block diagram illustrating an ATM, in accordance with an embodiment of the invention.

FIG. 2 illustrates one embodiment of the external apparatus 120 as an ATM 200 that the customer 110 may utilize to interact with a business representative. The ATM 200 includes a communication interface 210, a processor 220, a user interface 230, and a memory 240 having an ATM datastore 242 and the video-assisted customer experience application 250 stored therein. As shown, the processor 220 is operatively connected to the communication interface 210, the user interface 230, and the memory 240.

The communication interface 210 of the ATM 200 may include a contactless interface for receiving contactless transmissions from the user 110, such as, for example, from a user's mobile wallet. In one embodiment, the contactless interface is an NFC interface. The contactless interface is configured to contactlessly and/or wirelessly send and/or receive information over relatively short ranges (e.g., within four inches, within three feet, etc.). The contactless interface may include a transmitter, receiver, smart card, key card, proximity card, Bluetooth® device, radio frequency identification (RFID) tag and/or reader, and/or the like. In some embodiments, the contactless interface communicates information via radio, IR, and/or optical transmissions. Generally, the contactless interface is configured to operate as a contactless transmitter and/or as a contactless receiver. The contactless interface functions to enable transactions with users utilizing an external apparatus capable of contactless communication. Also, it will be understood that the contactless interface may be embedded, built, carried, and/or otherwise supported in and/or on the ATM 200. In some embodiments, the contactless interface is not supported in and/or on the ATM 200, but the contactless interface is otherwise operatively connected to the ATM 200 (e.g., where the contactless interface is a peripheral device plugged into the ATM 200, etc.). The contactless interface of the ATM 200 is configured to contactlessly and/or wirelessly communicate information to and/or from a separate external apparatus 120.

The communication interface 210 may generally also include a modem, server, transceiver, and/or other device for communicating with other devices and systems in communication with the network 150.

The user interface 230 of the ATM 200 may include a display (e.g., a liquid crystal display, a touchscreen display, and/or the like) which is operatively coupled to the processor 220. The user interface 230 may include any number of other devices allowing the ATM 200 to transmit/receive data to/from a user, such as a keypad, keyboard, touch-screen, touchpad, microphone, mouse, joystick, other pointer device, button, soft key, and/or other input device(s).

As further illustrated in FIG. 2, the memory 240 may include ATM applications such as the video-assisted customer experience application 250. It will be understood that the ATM applications can be executable to initiate, perform, complete, and/or facilitate one or more portions of any embodiment described and/or contemplated herein. Generally, the customer experience application 250 is executable to facilitate a communications link between the user 110 and a business representative.

Of course, the ATM 200 may require users 110 to identify and/or authenticate themselves to the ATM 200 before the ATM 200 will initiate, perform, complete, and/or facilitate a transaction or other communication. For example, in some embodiments, the ATM 200 is configured to authenticate an ATM user based at least partially on an ATM debit card, smart card, token (e.g., USB token, etc.), username, password, PIN, biometric information, and/or one or more other credentials that the user 110 presents to the ATM 200. Additionally or alternatively, in some embodiments, the ATM 200 is configured to authenticate a user by using one-, two-, or multi-factor authentication. For example, in some embodiments, the ATM 200 requires two-factor authentication, such that the user must provide a valid debit card and enter the correct PIN associated with the debit card in order to authenticate the user to the ATM 200. However, in some embodiments, the user may access the ATM 200 and view or receive content that may be transferred to/from the ATM 200.

Figure 3:
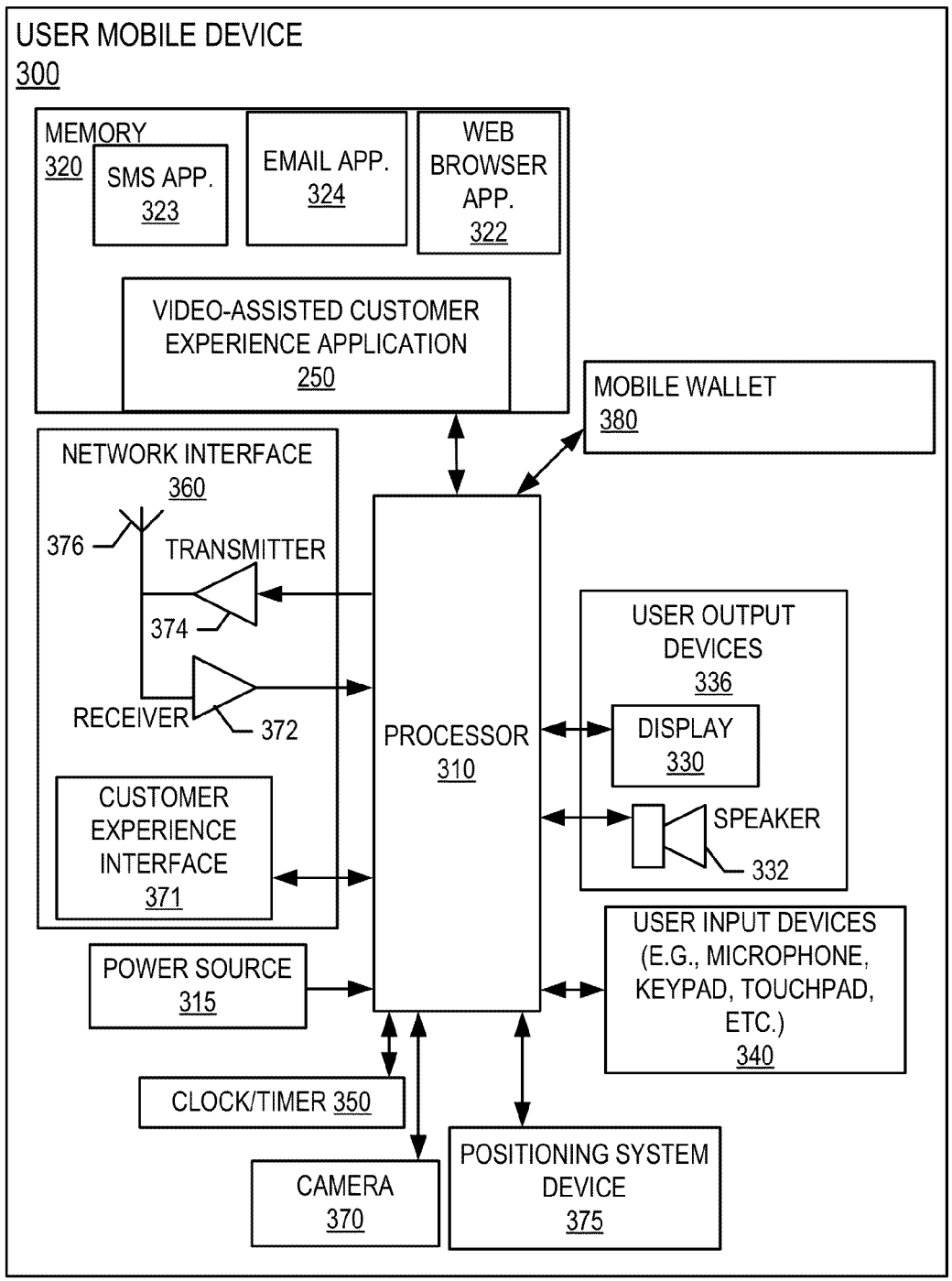
FIG. 3 illustrates a block diagram illustrating a mobile device, in accordance with an embodiment of the invention.

FIG. 3 illustrates a mobile device 300 as another example embodiment of an external apparatus 120 that may be utilized to provide a video-assisted customer experience. A "mobile device" 300 may be any mobile communication device, such as a cellular telecommunications device (i.e., a cell phone or mobile phone), personal digital assistant (PDA), a mobile Internet accessing device, or other mobile device including, but not limited to portable digital assistants (PDAs), pagers, mobile televisions, gaming devices, laptop computers, cameras, video recorders, audio/video player, radio, GPS devices, any combination of the aforementioned, or the like.

The mobile device 300 may generally include a processor 310 communicably coupled to such devices as a memory 320, user output devices 336, user input devices 340, a network interface 360, a power source 315, a clock or other timer 350, a camera 370, a positioning system device 375, a mobile wallet 380, etc. The processor 310, and other processors described herein, may generally include circuitry for implementing communication and/or logic functions of the mobile device 300. For example, the processor 310 may include a digital signal processor device, a microprocessor device, and various analog to digital converters, digital to analog converters, and/or other support circuits. Control and signal processing functions of the mobile device 300 may be allocated between these devices according to their respective capabilities. The processor 310 thus may also include the functionality to encode and interleave messages and data prior to modulation and transmission. The processor 310 may additionally include an internal data modem. Further, the processor 310 may include functionality to operate one or more software programs, which may be stored in the memory 320. For example, the processor 310 may be capable of operating a connectivity program, such as a web browser application 322. The web browser application 322 may then allow the mobile device 300 to transmit and receive web content, such as, for example, location-based content and/or other web page content, according to a Wireless Application Protocol (WAP), Hypertext Transfer Protocol (HTTP), and/or the like.

The processor 310 may also be capable of operating a client application, such as a video-assisted customer experience application 250. The customer experience application 250 is configured to facilitate a communications link between the external apparatus 120, in this embodiment a mobile device 300, and a business representative for providing the user 110 customer service. The application 250 may have a graphical user interface (GUI) that allows the user 110 to set certain preferences, request customer service, etc.

The processor 310 may be configured to use the network interface 360 to communicate with one or more other devices on the network 150. In this regard, the network interface 360 may include an antenna 376 operatively coupled to a transmitter 374 and a receiver 372 (together a "transceiver"). The processor 310 may be configured to provide signals to and receive signals from the transmitter 374 and receiver 372, respectively.

The processor 310 may be configured to provide signals to and receive signals from the transmitter 374 and receiver 372, respectively. The signals may also include signaling information in accordance with the air interface standard of the applicable cellular system of the wireless telephone network that may be part of the network 150. In this regard, the mobile device 300 may be configured to operate with one or more air interface standards, communication protocols, modulation types, and access types. By way of illustration, the mobile device 300 may be configured to operate in accordance with any of a number of first, second, third, and/or fourth-generation communication protocols and/or the like. For example, the mobile device 300 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 300 may also be configured to operate in accordance with non-cellular communication mechanisms, such as via a wireless local area network (WLAN) or other communication/data networks.

The network interface 360 may also include a customer experience interface 371 in order to allow a user to execute some or all of the processes described herein with respect to the video-assisted customer experience application 250. The customer experience interface 371 may have access to the hardware, e.g., the transceiver, and software previously described with respect to the network interface 360.

As described above, the mobile device 300 may have a user interface that includes user output devices 336 and/or user input devices 340. The user output devices 336 may include a display 330 (e.g., a liquid crystal display (LCD) or the like) and a speaker 332 or other audio device, which are operatively coupled to the processor 310. The user input devices 340, which may allow the mobile device 300 to receive data from a user 110, may include any of a number of devices allowing the mobile device 300 to receive data from a user 110, such as a keypad, keyboard, touch-screen, touchpad, microphone, mouse, joystick, other pointer device, button, soft key, and/or other input device(s).

The mobile device 300 may further include a power source 315. Generally, the power source 315 is a device that supplies electrical energy to an electrical load. In one embodiment, power source 315 may convert a form of energy such as solar energy, chemical energy, mechanical energy, etc. to electrical energy. Generally, the power source 315 in a mobile device 300 may be a battery, such as a lithium battery, a nickel-metal hydride battery, or the like, that is used for powering various circuits, e.g., the transceiver circuit, and other devices that are used to operate the mobile device 300. Alternatively, the power source 315 may be a power adapter that can connect a power supply from a power outlet to the mobile device 300. In such embodiments, a power adapter may be classified as a power source "in" the mobile device.

The mobile device 300 may also include a memory 320 operatively coupled to the processor 310. As used herein, memory may include any computer readable medium configured to store data, code, or other information. The memory 320 may include volatile memory, such as volatile Random Access Memory (RAM) including a cache area for the temporary storage of data. The memory 320 may also include non-volatile memory, which can be embedded and/or may be removable. The non-volatile memory may additionally or alternatively include an electrically erasable programmable read-only memory (EEPROM), flash memory or the like.

The memory 320 may store any of a number of applications or programs which comprise computer-executable instructions/code executed by the processor 310 to implement the functions of the mobile device 300 described herein. For example, the memory 320 may include such applications as a web browser application 322 and a video-assisted customer experience application 250. These applications may also typically provide a graphical user interface (GUI) on the display 330.

The memory 320 may also store any of a number of pieces of information, and data, used by the mobile device 300 and the applications and devices that make up the mobile device 300 or are in communication with the mobile device 300 to implement the functions of the mobile device 300 and/or the other systems described herein. For example, the memory 320 may include such data as user authentication information for the mobile device 300.

Figure 4:
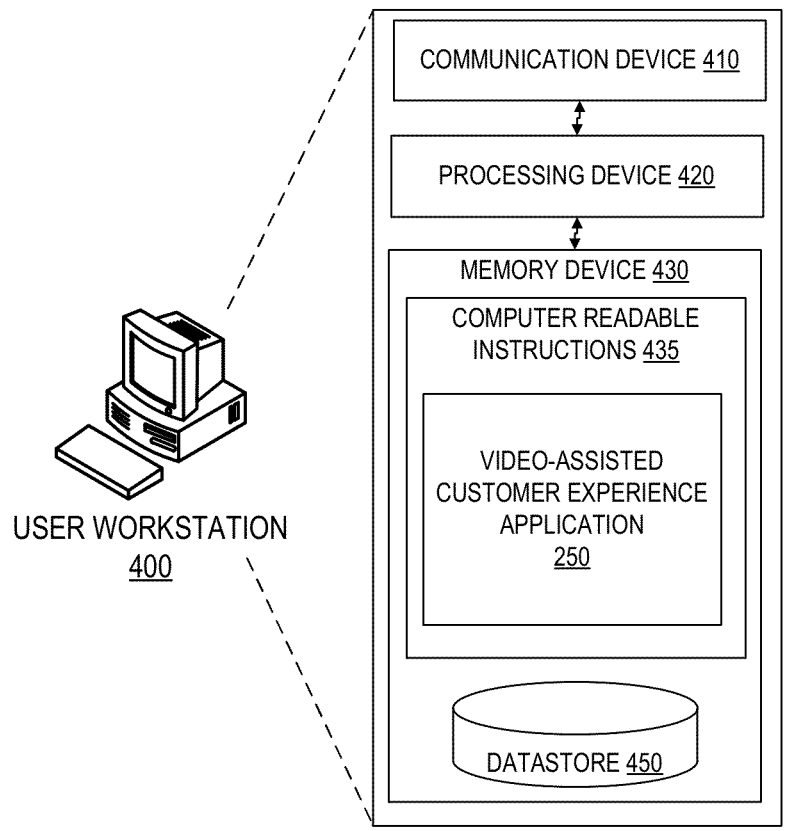
FIG. 4 illustrates a block diagram illustrating a user workstation, in accordance with an embodiment of the invention.

FIG. 4 illustrates a user workstation 400, which is another embodiment of the external apparatus 120 contemplated herein. The user workstation 400, in various embodiments, has a communication device 410 controlled by a processing device 420 in order to communicate across the network 110. As noted above, the network 110 is an intranet, the Internet, a local area network, a wide area network, and/or any other electronic device network, and/or any combination of the same. The processing device 420 is also in communication with a memory device 430 configured for storing computer-readable and computer-executable instructions 435. The computer-readable instructions, in various embodiments, include one or more applications, such as the video-assisted customer experience application 250.

Generally, in some embodiments, some, all or none of the method steps and/or sub-steps discussed herein are embodied in computer-executable instructions within the video-assisted customer experience application 250. In some embodiments, one or more applications are contained within a single customer experience application 250, and in other embodiments, the instructions for executing the method steps disclosed herein are spread over two or more applications. In some embodiments, some of the instructions for executing the methods disclosed herein are stored on the user workstation 400 and some of the instructions are stored on one or more other devices in communication with the network 150. In some embodiments, some or all the instructions are stored remotely from the user workstation 400 and accessed as necessary by the user workstation 400 and/or any other device requiring instructions. Further, in some embodiments, the memory device 430 includes a datastore 450 or database configured for storing information and/or data. In other embodiments, the datastore 450 is housed remotely from the user workstation 400 and the user workstation 400 is in communication with the datastore 450 across the network 110 and/or across some other communication link.

Figure 5:
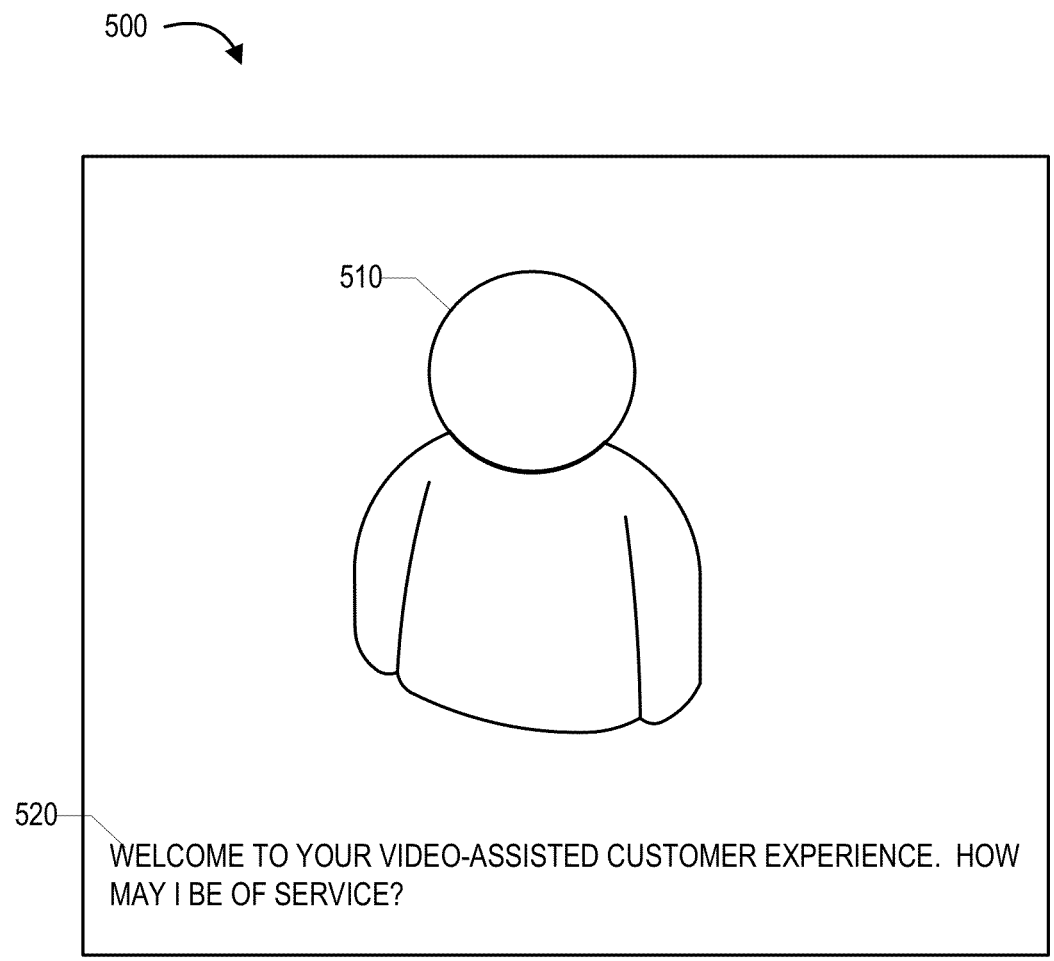
FIG. 5 illustrates a display of an external apparatus and a video-assisted customer experience, in accordance with an embodiment of the invention.

It should be noted that while an ATM 200, mobile device 300, user workstation 400, and teleconference system are specifically discussed as embodiments of the external apparatus 120, the external apparatus 120 may be any device capable of facilitating a communication link between the user 110 and the business representative. Turning now to FIG. 5, illustrated is an embodiment of a display 500 for the external apparatus 120. As shown, the external apparatus 120 may display video content to the user 110 facilitating an interaction between the user 110 and a business representative. The video content may include a representation 510 of the business representative. The representation 510 may be live video of the business representative. In some embodiments, however, the representation 510 may simply be a still photo of the business representative (which may or may not be a photo of the actual business representative speaking). In some embodiments, the representation 510 in the video may be an avatar associated with the business representative. Such an avatar may be animated or a still representation. In one embodiment, the business representative may have the ability to alter the representation such as choosing between a live view, an avatar, and even a hybrid view of a live view such that the features of the business representative are altered. In some embodiments, the live view is enhanced to remove blemishes, wrinkles, change hair color, etc. In some embodiments, the "video" may simply be desired graphics or even a blank screen.

Regardless of the form of the representation 510 of the business representative in the video, the external apparatus 120 will be capable of displaying the subtitles 520 of the words spoken by the business representative. The video-assisted customer experience application 250 includes, or is in communication with an application capable of, speech-recognition technology in order to provide subtitles 520 of the words spoken by the business representative on the display 500 of the external apparatus 120 to the user 110.

The speech-recognition technology may be any application that converts spoken words to text with an acceptable error rate. Various speech-recognition software is commercially available from Nuance Communications, Inc., Siri® marketed by Apple, Inc., as well as numerous others, for non-limiting examples. In some embodiments, the speech-recognition technology is voice-recognition technology which is generally trained to a particular speaker to reduce error rates. The performance of the speech-recognition technology may be an acceptable level chosen by the business entity. The performance of speech recognition systems is usually evaluated in terms of accuracy and speed. Accuracy is usually rated with word error rate, whereas speed is measured with the real time factor (i.e., the amount of time it takes for the spoken words to be provided on the display 500 as subtitles 520). Of course, the accuracy may also depend somewhat on the business representative. Accuracy may vary due to vocabulary size and confusability, speaker dependence vs. independence, isolated, discontinuous, or continuous speech, task and language constraints, read vs. spontaneous speech, adverse conditions, background noise, etc. Typically, it is desired that the error rate be less than 20%, and preferably less than 10%. In most circumstances, a minimal error rate is acceptable as the user 110 is presumed to have the ability to understand the true meaning of some errors given the context of the error with respect to the subject matter being communicated.

In some embodiments, some words spoken may be key words that, when converted to text and presented in the subtitles 520, may be interactive to the user 110. For instance, if a business representative names a particular product or service, the text may be highlighted indicating to the user 110 that the text is interactive and the user 110 may interact, such as by clicking, touching, etc., with the text to retrieve information about the product or service, order the product or service, etc. For another example, the business representative may reference a particular website and the text may be presented as a hyperlink to the website in the subtitles 520.

Again, the speech-recognition technology may be implemented in any desired manner. Generally, the technology will incorporate acoustic modeling and/or language modeling. Hidden Markov models are utilized in some embodiments. Hidden Markov models are statistical models that output a sequence of symbols or quantities.

Providing subtitles 520 to the user 110 may provide a number of benefits. Of course, subtitles 520 provide an improved customer experience for hearing-impaired users 110. Additionally, a subtitled video communication may assist a user 110 to neutralize accents and/or dialects of business representatives that the user 110 may not be familiar with. Furthermore, in some embodiments, the video-assisted customer experience provides an avenue for a user 110 to effectively communicate with a business representative that speaks a language not understood by the user 110. In such embodiments, the customer experience application 250 is capable of, or in communication with an application capable of, translating words spoken by the business representative and providing the translated text as subtitles 520.

Another benefit provided by the video-assisted customer experience is the ability of the user 110 to tailor the privacy of the communication with the business representative. In some customer experience communications, such as communications with a business that is a financial institution, the subject matter being discussed may be sensitive and the user 110 may wish to reduce the volume or mute the audio of the business representative and rely on the subtitles 520 to receive the communications from the business representative.

In some embodiments, a storage device may be in communication with the network 150. Such a storage device may be utilized to save and store the communication between the user 110 and the business representative. With a record of the communication being converted to text, the archive of previous communications may be readily searchable. Additionally, such stored communications may be utilized by the business entity for training purposes, legal proceedings, customer relationship management (CRM), etc.

Of note, benefits discussed above are generally discussed in reference to the benefits of the video-assisted customer experience provided to the user 110. However, the benefits discussed above may also benefit the business representative in similar manner such that the business representative may provide an improved customer experience to the user 110. Thus, in some embodiments, the video is a one-way video such that only the user 110 has a display of a representation 510 and subtitles 520. In other embodiments, the video is a two-way video such that the user 110 may view a representation 510 of the business representative and the business representative may view a representation 510 of the user 110. In such two-way embodiments, it is contemplated that just the user 110 may have the option of receiving subtitles 520 or both the user 110 and the business representative may have the option of receiving subtitles 520. Regardless of whether the business representative receives video with or without subtitles, it is contemplated that the video-assisted customer experience application 250 is capable of utilizing the speech-recognition technology to archive the speech converted to text of each party in the communication. Similarly, the user 110 may have the option to toggle the subtitles 520 on/off which may not affect the ability to archive the communication on the storage device.

Figure 6:
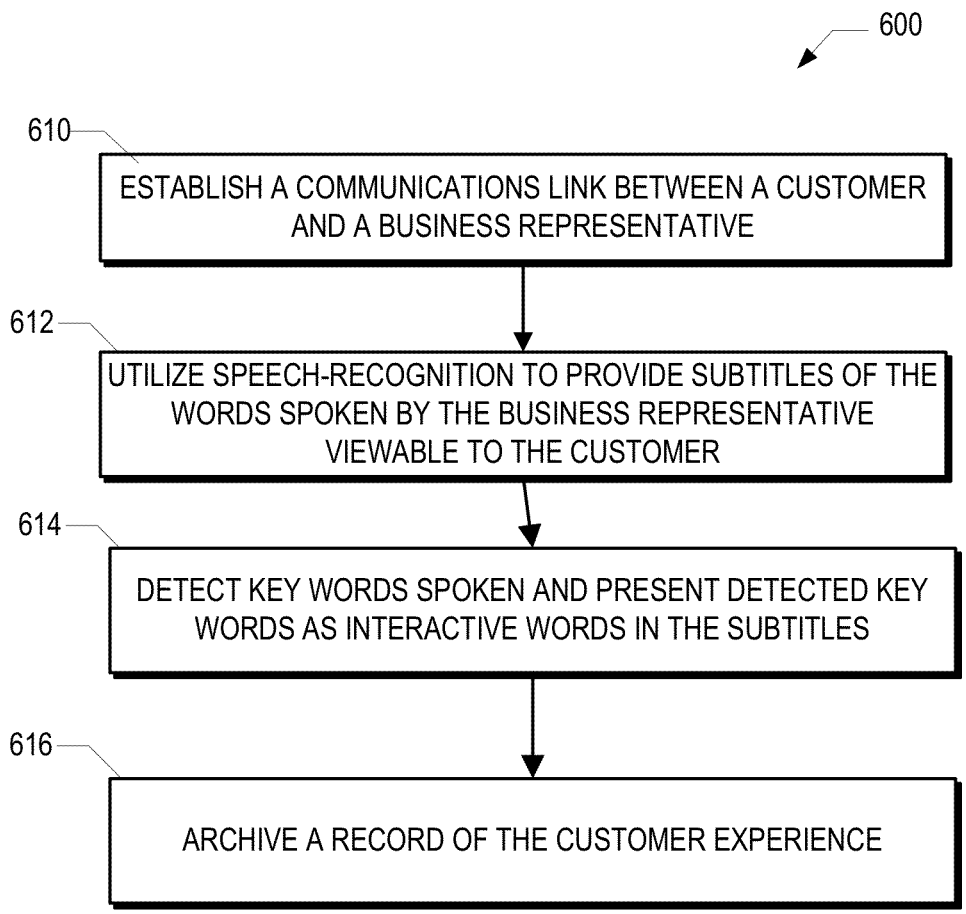
FIG. 6 is a flow diagram of a method for providing a video-assisted customer experience, in accordance with an embodiment of the invention.

Referring now to FIG. 6, illustrated is a high level flow diagram of a method 600 for providing a video-assisted customer experience. At block 610, a communications link is established between a customer and a business representative. The communications link is facilitated by the external apparatus 120. The link includes video such that the customer may view the business representative or a representation of the business representative on the display of the external apparatus.

At block 612, speech-recognition is utilized to provide subtitles of the words spoken by the business representative viewable to the customer. In some cases, the speech-recognition engine is configured to detect certain key words spoken and present the detected key words as interactive words in the subtitles. The customer may then click, or otherwise interact with the word to obtain further information, link to a webpage, etc. as shown at block 614. At block 616, the interaction between the customer and the business representative may be archived in a database or other storage device in communication with the network 115. Such a database may be text-searchable based on the subtitles 520.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein above with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

As used herein, a processor/computer, which may include one or more processors/computers, may be "configured to" perform a stated function in a variety of ways, including, for example, by having one or more general-purpose circuits perform the stated function by executing one or more computer-executable program code portions embodied in a computer-readable medium, and/or by having one or more application-specific circuits perform the stated function.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for providing a video-assisted customer experience comprising:
   providing a communications link between a customer and a business representative, the communications link being facilitated by an external apparatus comprising a display, wherein the communications link comprises video such that the customer may view the business representative or a representation of the business representative on the display;
   utilizing speech-recognition to provide subtitles of the words spoken by the business representative viewable to the customer;
   detecting key words, using a computing device processor, spoken by the business representative, wherein the key words include a product or service provided by the business of the business representative;
   highlighting, using a computing device processor, the detected key words spoken by the business representative, wherein highlighting further comprises integrating a selectable link to a website of the business that includes information and ordering for the product or service of the key words, wherein the product or service of the key words are financial products or services; and
   enabling, using a computing device processor, the customer to select via the selectable link the detected key words, wherein the selection directs the user to the website of the business that includes information and ordering for the financial product or service of the key words.

2. The method of claim 1, wherein the external apparatus is an automated teller machine (ATM).

3. The method of claim 1, further comprising archiving a record of the customer experience, wherein the subtitles are searchable.

4. The method of claim 1, wherein the speech-recognition is voice-recognition.

5. The method of claim 1, wherein the subtitles are translated and presented to the customer in a different language than the language spoken by the business representative.

6. The method of claim 1, wherein the communications link is a one-way video link such that the customer may view the business representative or a representation of the business representative.

7. The method of claim 1, wherein the communications link is a two-way video link such that the customer may view the business representative or a representation of the business representative and the business representative may view the customer or a representation of the customer.

8. The method of claim 7, wherein subtitles of the words spoken by the customer are displayed to the business representative.

9. The method of claim 1, wherein the speech-recognition is configured to detect key words or phrases spoken and present the detected key words as interactive words in the subtitles.

10. A system for providing a video-assisted customer experience comprising: a network;
    an external apparatus in communication with the network, the external apparatus comprising a display and a processing device, wherein the processing device is configured to execute computer-readable program code to:
    provide a communications link between a customer accessing the external apparatus and a business representative, wherein the communications link comprises video such that the customer may view the business representative or a representation of the business representative on the display of the external apparatus;
    utilize speech-recognition to provide subtitles of the words spoken by the business representative viewable to the customer;
    detect key words, using a computing device processor, spoken by the business representative, wherein the key words include a product or service provided by the business of the business representative;
    highlight the detected key words spoken by the business representative, wherein highlighting further comprises integrating a selectable link to a website of the business that includes information and ordering for the product or service of the key words, wherein the product or service of the key words are financial products or services; and
    enable the customer to select via the selectable link the detected key words, wherein the selection directs the user to the website of the business that includes information and ordering for the financial product or service of the key words.

11. The system of claim 10, wherein the external apparatus is an automated teller machine (ATM).

12. The system of claim 10, wherein the processing device is further configured to execute computer-readable program code to archive a record of the customer experience, wherein the subtitles are searchable.

13. The system of claim 10, wherein the subtitles are translated and presented to the customer in a different language than the language spoken by the business representative.

14. The system of claim 10, wherein the communications link is a one-way video link such that the customer may view the business representative or a representation of the business representative.

15. The system of claim 10, wherein the communications link is a two-way video link such that the customer may view the business representative or a representation of the business representative and the business representative may view the customer or a representation of the customer.

16. The system of claim 15, wherein subtitles of the words spoken by the customer are displayed to the business representative.

17. The system of claim 10, wherein the speech-recognition is configured to detect key words or phrases spoken and present the detected key words as interactive words in the subtitles.

18. A non-transitory computer-readable storage medium comprising computer program code for providing a video-assisted customer experience, the computer program code comprising:
   instructions for providing a communications link between a customer and a business representative, the communications link being facilitated by an external apparatus comprising a display, wherein the communications link comprises video such that the customer may view the business representative or a representation of the business representative on the display;
   instructions for utilizing speech-recognition to provide subtitles of the words spoken by the business representative viewable to the customer
   instructions for detecting key words spoken by the business representative, wherein the key words include a product or service provided by the business of the business representative;
   instructions for highlighting the detected key words spoken by the business representative, wherein highlighting further comprises integrating a selectable link to a website of the business that includes information and ordering for the product or service of the key words, wherein the product or service of the key words are financial products or services; and
   instructions for enabling the customer to select via the selectable link the detected key words, wherein the selection directs the user to the website of the business that includes information and ordering for the financial product or service of the key words.

19. The non-transitory computer-readable storage medium of claim 18, wherein the external apparatus is an automated teller machine (ATM).

20. The non-transitory computer-readable storage medium of claim 18, wherein the computer program code further comprises instructions for archiving a record of the customer experience, wherein the subtitles are searchable.

21. The non-transitory computer-readable storage medium of claim 18, wherein the subtitles are translated and presented to the customer in a different language than the language spoken by the business representative.

22. The non-transitory computer-readable storage medium of claim 18, wherein the communications link is a one-way video link such that the customer may view the business representative or a representation of the business representative.

23. The non-transitory computer-readable storage medium of claim 18, wherein the communications link is a two-way video link such that the customer may view the business representative or a representation of the business representative and the business representative may view the customer or a representation of the customer.

24. The non-transitory computer-readable storage medium of claim 23, wherein subtitles of the words spoken by the customer are displayed to the business representative.

25. The non-transitory computer-readable storage medium of claim 18, wherein the speech-recognition is configured to detect key words or phrases spoken and present the detected key words as interactive words in the subtitles.

* * * * *